No. 793,998. PATENTED JULY 4, 1905.
G. B. DRYDEN.
TIRE FOR VEHICLE WHEELS.
APPLICATION FILED JULY 8, 1904.
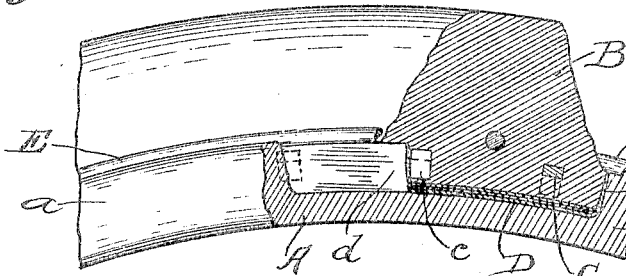
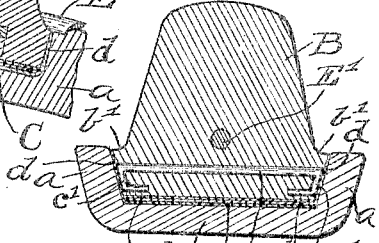
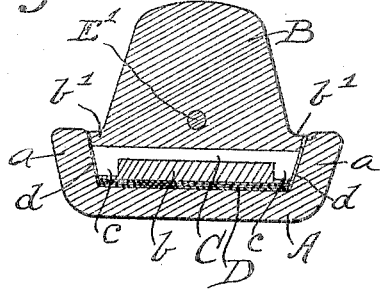
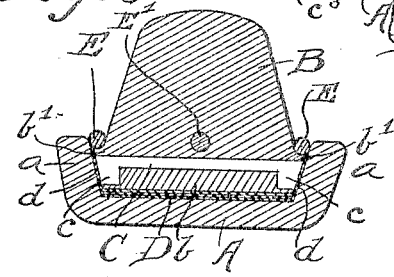
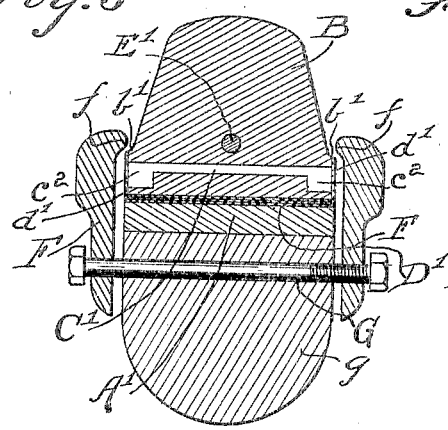
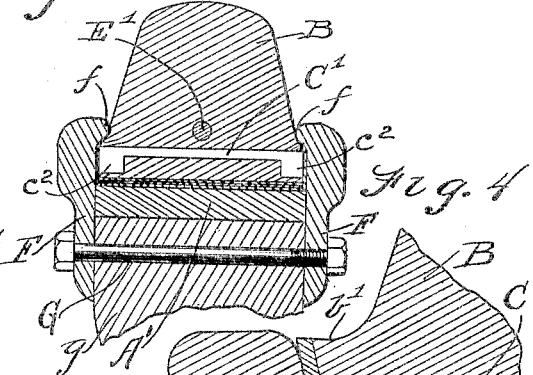
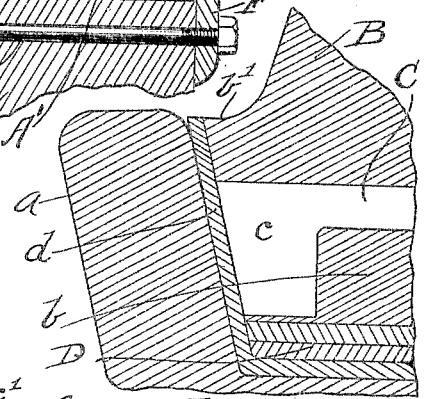
Witnesses
J. W. Angell.
W. W. Witherbury
Inventor
George B. Dryden
by Charles C. Hill, Atty.

No. 793,998. Patented July 4, 1905.

UNITED STATES PATENT OFFICE.

GEORGE B. DRYDEN, OF CHICAGO, ILLINOIS.

TIRE FOR VEHICLE-WHEELS.

SPECIFICATION forming part of Letters Patent No. 793,998, dated July 4, 1905.

Application filed July 8, 1904. Serial No. 215,718.

*To all whom it may concern:*

Be it known that I, GEORGE B. DRYDEN, a citizen of the United States, and a resident of the city of Chicago, county of Cook, and State of Illinois, have invented certain new and useful Improvements in Tires for Vehicle-Wheels; and I do hereby declare that the following is a full, clear, and exact description of the same, reference being had to the accompanying drawings, and to the letters of reference marked thereon, which form a part of this specification.

This invention relates to tires for vehicle-wheels, and more particularly to a rubber tire provided with retaining means adapted to secure the tire firmly in place and affording maximum resiliency of the same.

Of the tires heretofore constructed in which transverse wires or bars of any kind or nature have been employed in connection with side binding-wires the binding-wires have usually rested immediately upon the cross wires or bars. When so constructed, the slight relative movement of said cross-wires and side binding-wires, together with the grit or dirt finding its way to the points of contact, soon cuts off or wears away said wires sufficiently for the tire to come off the rim. In some cases such tires are easily rolled from the rim owing to the inward pressure of the side binding-wires upon the extremities of the cross-wires, which tend to spring the ends of the cross-wires inwardly, while the middle of the same bows outwardly with the rubber beneath the same. This tendency is always present where cross-wires and side binding-wires are used, and the great lateral stress occasioned by turning corners rapidly and by the inequalities of the road is sufficient to roll most such tires from the channels even when first applied. The tendency is of course increased by continued use of the tires weakening the cross-wires.

The object of this invention is to provide a tire with cross wires or bars embedded therein adapted to receive and support the stress of the side binding-wires, but from which said side binding-wires are separated by a resilient pad of the tire material.

It is also an object of the invention to provide a construction such that whatever the inward stress at the ends of the cross-bars springing or bowing the cross-wires by the application of the side binding-wires even under the most severe lateral stress is entirely obviated, while maximum resiliency of the structure is maintained.

It is a further object of my invention to provide a construction whereby tires of the class described can be secured to vehicle-wheels having flat tires of the ordinary kind, dispensing with the channels heretofore used.

The invention consists in the matters hereinafter described, and more fully pointed out and defined in the appended claims.

In the drawings, Figure 1 is a fragmentary side elevation showing the tire, channel, and side retaining-wires broken obliquely. Fig. 2 is a transverse section of the channel with the tire-strip therein, but the side binding-wires omitted. Fig. 3 is a similar view showing the side binding-wires in place. Fig. 4 is an enlarged fragmentary detail of the channel and the tire-strip therein. Fig. 5 is a transverse section illustrating the application of my invention to a flat tire. Fig. 6 is a similar view showing the tire-strip secured in place. Fig. 7 is a perspective view of one of the transverse bars. Fig. 8 is a sectional view similar to Fig. 2, but showing another form of the cross-bar. Fig. 9 is a perspective view of the cross-bar shown in Fig. 8.

As shown in said drawings, A indicates the usual channel adapted to be secured to the rim of a vehicle-wheel and provided with outwardly diverging or flaring flanges *a* in the usual manner. Seated within said channel is the tire-strip B, which, as shown, is provided with a base portion *b*, which fits closely in and approximately fills the channel and an upwardly-extending tread portion which may be of any convenient shape or conformation in cross-section. As shown, said tire-strip at a point approximately corresponding with the top of the side flanges *a* curves inwardly, affording a shoulder of rubber *b'*, which extends the entire length of the tire-strip on each side of the same and below which, arranged short distances apart and extending transversely in the base portion of the tire, are metallic cross-bars C, which, as shown, though not necessarily, are flattened, affording a relatively broad upper and lower face. Each of said cross-bars at its ends is provided with a downward extension or foot *c*, which is shaped to lie approximately parallel with the inner faces of the channel and to afford a sufficiently broad bearing-face or under surface to avoid cutting the thin layer of the tire-base beneath the same, which thus affords a resilient support for the cross-bar within the channel. Said feet or ends *c* are provided on their inner sides with shoulders, which are bedded in the material of which the tire is constructed and act to prevent movement of said side bars with respect to the tire, thus avoiding a frequent cause of tearing. As shown, a plurality of layers of canvas D or other suitable material are vulcanized on the base of the tire, and an outer covering of canvas *d* extends around the base portion of the tire to the shoulders of rubber *b'*, concealing the ends of the cross-bars.

As shown in Figs. 1 to 4, inclusive, the tires are retained in place by retaining-bands or side binding-wires E, which engage on the shoulders *b'* within the flanges of the channel. Frequently, however, it is desirable to secure a rubber tire on the wheels provided with flat tires instead of channels. For this purpose the tire-strips are constructed as before described and the transverse bars C' are provided with approximately right-angled, downturned ends $c^2$. An annular clamping-band F is secured on each side of the wheel-rim by means of bolts G and projects peripherally beyond the same, and at its periphery is provided with an inwardly-directed upwardly-inclined rounded flange *f*, adapted to engage above the shoulders *b'* of the tire-strip, as shown in Figs. 5 and 6. When the annular clamping-bands F are drawn inwardly by means of said bolts, said flanges engaging over the shoulders *b'* are drawn radially inward into positive bearing upon the flat tire A'.

The operation is as follows: When used in a channel-rim, as shown in Figs. 1 to 4, inclusive, and in Fig. 8, the tire-strip B is fitted theerto, approximately filling the channel. When the side retaining bands or wires E are secured in place, the rubber forming the shoulder *b'* is greatly compressed, and the pressure is communicated to the transverse bars C and to the very thin layer of rubber and the canvas below the feet *c*, the downturned ends of said bar tending to slightly compress the same and to communicate the greater part of the pressure to the bottom of the channel. Inasmuch as the inner approximately parallel faces of said downturned ends or feet bear against the rubber included between the same, these aid in stiffening the cross-bars, and there is no tendency to bend or spring the cross-bars by said pressure. The downward pressure of the binding-wires upon said bars also brings the flattened ends of the cross-bars, which are shaped complementally with the inclination of the side flanges, into close relation, though not necessarily into binding pressure upon said flanges, thus preventing any movement of said bars or displacement thereof in the tire-strip, such as sometimes causes the tire to tear.

In the construction illustrated in Figs. 8 and 9 the cross-bars are formed of flattened rods or wires C', each of which is bent at the ends to afford a downturned foot *c'*, on the inner end of which is an inwardly-directed hook $c^3$, engaging in the tire-base just above the reinforcing base layers D. This construction affords a broader base for the feet and yet permits the rubber to bend in said hooked ends, thus affording a double hold at each end of said cross-bars in the tire-strip. It will also be seen that the canvas strip D at the base of the tire-strip and the layer of canvas *d* inclosing the same and extending upwardly on the tire to the shoulders *b'* act to greatly stiffen the base of the tire, and being vulcanized to the tire prevent any tendency to draw away from the transverse bars when subjected to lateral stress.

In the use of the construction illustrated in Figs. 5 and 6 the tire-strip lies in position upon the usual steel tire A' of the wheel, and the retaining or clamping members F are secured in place with the flanges *f* thereof directed above and in engagement with the shoulders *b'* of the tire-strip. The nuts on the bolts are then set up, drawing said annular retaining members inwardly against the tire and drawing the tire-strip inwardly, thereby compressing the base of the tire and rigidly binding the same in place. If preferred, a central longitudinal binding-wire E' may be used in this or in the construction before described.

The thickness of the layer of rubber beneath the downturned ends of the transverse bars is exaggerated in the drawings for the purpose of making the illustration clearer, and ordinarily but a slight thickness of the resilient material is used. When used, however, it affords a degree of resiliency beneath the feet *c* $c^2$ or ends $c^3$ of said bars, though the ends thereof are brought sufficiently close to the bottom of the channel to communicate the pressure of the side retaining-wires thereto.

While I have described particular features of construction, my invention is capable of embodiment in different ways, and either with side binding or central binding wires or both, as preferred. I therefore do not desire to limit this application otherwise than necessitated by the prior art and as stated in the claims, as obviously many details of construction may be varied without departing from the principles of my invention.

I claim as my invention—

1. The combination with a vehicle-tire strip comprising a strip of rubber shaped at its base to fit in a tire-channel, of a shoulder extending longitudinally of said tire-strip on each side thereof at the top of the base portion, a reinforcing-base of fabric or the like permanently secured to the bottom of the tire-strip, an investing fabric inclosing the same and extending to said shoulders, transverse binding-bars lying beneath said shoulders and a downturned foot at each end of each bar extending into close proximity with the reinforcing fabric at the base and affording a broad bearing thereon, the ends of said bars having a layer of rubber above and below the same.

2. The combination with a channeled rim of a vehicle or the like, of a rubber tire-strip fitted in said channel, a reinforcing-base of fabric or the like on said tire-strip, a shoulder on each side the tire-strip at approximately the top of the channel, retaining means engaging on each of said shoulders and cross-wires arranged short intervals apart and disposed below said shoulders and each comprising a bar extending from side to side in the tire-base and provided with downturned ends or feet approximately parallel with the sides of the tire-base on their outer sides, and at their bottoms affording a broad bearing adjacent to but slightly above the reinforcing-base.

3. The combination with a vehicle-wheel having a channeled rim of a tire-strip comprising a tread portion and a base portion fitting said channel, a shoulder on each side the tire-strip at approximately the top of the channel a central binding-wire in said strip transverse bars in said base below said shoulders, downwardly-directed hooked ends on said bars directed to and bedded in said bottom base portion a plurality of layers of fabric on the base of said strip and a strip of fabric inclosing the same and extending to the top of the rim.

4. The combination with a vehicle-wheel of a tire thereon, annular clamping-bands secured on each side of the tire and inwardly and upwardly inclined lips or flanges on each of said clamping-bands, a tire-strip having a base width corresponding with that of the wheel-tire, a shoulder thereon at approximately the height of the inwardly-directed flanges or shoulders on the clamping-bands, transverse bars or rods bedded in the tire-base below said shoulders, inwardly-turned ends on each cross-bar affording a broad bearing-face in the bottom of the tire-strip, bolts extending through the wheel-rim and the clamping-bands and acting to draw the same inwardly whereby said lips or flanges on the clamping-bands, act to compress the tire-base inwardly by engagement above said shoulders.

5. The combination with a vehicle-wheel of a tire thereon, annular clamping-bands secured on each side of the tire and inwardly and upwardly inclined lips or flanges on each of said clamping-bands, a tire-strip having a base width corresponding with that of the wheel-tire, a shoulder thereon at approximately the height of the inwardly-directed flanges or shoulders on the clamping-bands, transverse bars or rods bedded in the tire-base below said shoulders, inwardly-turned ends on each cross-bar affording a broad bearing-face in the bottom of the tire-strip, bolts extending through the wheel-rim and the clamping-bands and acting to draw the same inwardly whereby said lips or flanges on the clamping-bands act to compress the tire-base inwardly by engagement above said shoulders, and a central longitudinal binding-wire extending through the tread portion of the tire above the cross-wires.

6. In a tire for vehicle-wheels, a tire-strip, transverse binding-wires bedded therein, a downwardly-directed end or foot on each end of each extending to near the bottom of the strip and parallel with the sides and affording broad inwardly-directed faces between which a part of the tire-strip is engaged whereby downward pressure acts to compress the base transversely means adapted to compress said strip at the sides and center thereof and a fabric beneath the strip and extending upwardly beyond the ends of said binding-wires.

In testimony whereof I have hereunto subscribed my name in the presence of two subscribing witnesses.

GEORGE B. DRYDEN.

Witnesses:
C. W. HILLS,
J. J. McFARLANE.